United States Patent Office 2,959,598
Patented Nov. 8, 1960

2,959,598
ALLYL CHLORIDE-CYCLIC ETHER GRIGNARD REAGENTS

Hugh E. Ramsden, Scotch Plains, N.J., assignor to Metal & Thermit Corporation, Woodbridge Township, N.J., a corporation of New Jersey No Drawing. Filed Aug. 14, 1958, Ser. No. 754,920

9 Claims. (Cl. 260—346.1)

The present invention relates to the art of preparing allylic magnesium chlorides. This application is a continuation-in-part of my application Serial No. 549,541, filed November 28, 1955, now abandoned.

Perhaps the greatest difficulty of the classic Grignard process is the use of diethyl ether which is a difficult and dangerous material to handle. Allyl magnesium chlorides have been prepared by using a large excess of diethyl ether with reaction times of about 10 to 20 hours required. Allylic chlorides are very reactive; in the preparation of Grignard reagents they tend to form coupling products competively with the formation of the Grignard reagent. Although the classic Grignard synthesis has proven to be one of the most valuable and versatile methods of synthesis in the laboratory, it has not been utilized on a commercial scale to any great extent due to the aforementioned and other difficulties.

I have now discovered a simple process for preparing allylic magnesium chlorides.

The present invention is directed to the preparation of alylic magnesium chlorides by reacting an alylic chloride with magnesium in the presence of a cyclic tetramethylene or pentamethylene oxide, herein called a cyclic ether.

The cyclic ether is selected from the class consisting of tetrahydrofuran, tetrahydropyran, 2-methyltetrahydrofuran, 2-ethoxytetrahydropyran, tetrahydrofurfuryl ethyl ether, dihydropyran, and N-methylmorphiline. The cyclic ether also apparently functions as a solvent. Thus, a cyclic ether which has a high melting point may still function in this invention, but if it is used as solvent, obviously the high melting point (e.g., above 90° C.) causes great difficulty in carrying out the reaction.

The reactions are carried out in the cyclic ether as reaction medium. The formation of the Grignard may take place without the need for initiation. However, for some reactants, initiation of the reaction is required and may be accomplished by suitable means, such as the addition of a small amount of ethyl bromide and/or an ether and/or an iodine crystal, etc. The temperature at which the reaction is carried out is between room temperature and the reflux temperature of the reaction mixture. It may, if desired for special purposes, be carried out at a temperature lower than room temperature. It is usually preferable to maintain the reaction mixture at reflux during the addition and subsequent reaction period. The reaction mixture is preferably agitated during the course of the reaction, and an inert atmosphere, e.g., nitrogen, which is cheapest, is preferably maintained.

Using the cyclic ether as the reaction medium, the allylic magnesium chloride is believed to form complexes of the "etherate" type with the cyclic ether. These complexes are believed to contain at least one molecule of cyclic ether for each molcule of allylic magnesium chloride produced. Where the allylic magnesium chloride is produced in a reaction medium containing more than equal molecular amounts of the cyclic ether, the number of cyclic ether molecules in the complex may be in excess of one. The maximum number of ether molecules which may be present in the complex is difficult to ascertain. When the maximum is exceeded, the cyclic ether is present as a solvent for the complex. Where more than one molecule of cyclic ether is present in the complex, e.g., 3 molecules, it is possible to distill off the molecules in excess of one by adding a high-boiling inert solvent such as toluene, xylene, cumene, or kerosene and distilling. The last molecule of the cyclic ether is bound to the complex quite tenaciously and is not removed readily. It is believed that the cyclic ether is complexed to the allylic magnesium chloride in small whole numbers, i.e., 1, 2, or 3 molecules, and not in intermediate numbers. However, since the reaction product may exist in mixtures of complexes having different numbers of molecules of cyclic ethers, it is possible that the average number of molecules of cyclic ether for each molecule of allylic magnesium chloride may not be a whole number, i.e., 1.5. The precise manner in which the cyclic ether is complexed is not entirely known. It is presumably complexed as allyl MgCl·(ether), but since Grignard reagents are also considered to exist according to the equilibrium:

it is conceivable that the complex of the cyclic ether may exist as:

½ allyl₂ Mg+MgCl₂·(ether)

rather than as allyl MgCl·(ether). Consequently, when referring to the complex of the invention, it is intended to encompass whichever form may actually exist.

Allylic chlorides have the general formula

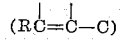

wherein R is a hydrocarbon radical. The most available species of this group of materials are allyl chloride and methallyl chloride.

The following examples are illustrative of the invention:

EXAMPLES

A standard experimental procedure was followed in the examples. When the experimental conditions deviated from sandard procedure, it is noted in the description of the experiment.

Magnesium turnings (24.3 grams (1 g. atom)) and a small iodine crystal were charged into a 1,000 ml. (in some cases a 500 ml.) 3 neck flask which was then purged with nitrogen. In another flask, a mixture was prepared by dissolving 1 mole of the organic chloride utilized in 216.0 grams (3 moles) of solvent tetrahydrofuran. Of this mixture 10 ml. was then added to the charge in the 3 neck flask and the reaction was initiated by addition of 2 ml. of ethyl bromide. After initiation of the reaction, the remainder of the organic chloride/tetrahydrofuran mix was slowly added to the 3 neck flask, with constant stirring. The formation of the organic magnesium chloride complexes is usually exothermic. When necessary, external heat is applied to the flask to keep the reaction going and/or to cary it to completion. At the completion of the reaction, the product was titrated in the standard Gilman test to determine the yield of organic magnesium chloride complex.

*Example 1.—Allylmagnesium chloride complex*

Allyl chloride (76.5 grams (1 mole)) was dissolved in the tetrahydrofuran. The reaction was completed in 2 hours and 10 minutes. The yield of allylmagnesium chloride complex as titrated was 64.5%; the magnesium consumed, 82.4%.

*Example 2.—β-Methallylmagnesium chloride complex*

β-Methallyl chloride (90.5 grams (1 mole)) was dissolved in the tetrahydrofuran. The reaction was maintained between 10° C. and 30° C. utilizing an acetone and Dry Ice bath. The reaction was stopped after 5 hours and 40 minutes. The yield of β-methallylmagnesium chloride complex as titrated was 47.8%; the magnesium consumed 71.2%.

*Example 3.—Allyldimethylcarbinol*

One mole of acetone (dried over anhydrous sodium sulfate) is added to one mole of allylmagnesium chloride prepared in, and still with 2-methyltetrahydrofuran, at reflux temperatures. The mixture is stirred at reflux for one hour after the addition, cooled, and added to 200 ml. of water and 50 ml. of concentrated hydrochloric acid. The layers are separated and the organic layer is distilled free of 2-methyltetrahydrofuran and then carefully fractionated at about 150 mm. pressure to obtain allyldimethylcarbinol.

*Example 4.—Methallylphenylketone, dimethallylphenylcarbinol*

One mole of methallylmagnesium chloride prepared and still in tetrahydropyran is added slowly to one mole of benzoyl chloride in tetrahydropyran. The reaction mix is stirred and cooled during addition. After acidification, separation of layers, and removal of tetrahydropyran, the residue is distilled under reduced pressure (1 mm.) to yield methallylphenylketone and as a higher boiling fraction, dimethallylphenylcarbinol.

Similar results to those of Example 1 are obtained when the same procedure is followed, with the use of other cyclic ethers as dihydropyran, 2-ethoxytetrahydropyran, tetrahydrofurfuryl ethyl ether, and N-methylmorpholine, in place of tetrahydrofuran.

The greatest advantage and utility of the process over the prior art resides in the rapidity, safety, economy and relative high yields with which the complexes of allylmagnesium chloride in the cyclic ether are prepared as compared with the allylmagnesium chlorides of the prior art. The allylic chlorides prepared in the cyclic ethers and in the form of complexes are useful as chemical intermediates in the preparation of organic compounds. This is illustrated in Examples 3 and 4.

While the invention has been described with particular reference to specific embodiments, it is to be understood that it is not limited thereto but is to be construed broadly and restricted solely by the scope of the appended claims.

I claim:

1. A process for preparing a solution of a complex of an allylic magnesium chloride and a cyclic ether which comprises reacting magnesium with an allylic chloride selected from the class consisting of allyl chloride and methallyl chloride in the presence of a cyclic ether selected from the class consisting of tetrahydrofuran, tetrahydropyran, 2-methyltetrahydrofuran, dihydropyran, 2-ethoxytetrahydropyran, tetrahydrofurfuryl ethyl ether and N-methylmorpholine, the molecular ratio of said cyclic ether to said allylic chloride being at least 1:1.

2. The process of claim 1 wherein the molecular ratio of cyclic ether to allylic chloride is 3:1.

3. The process of claim 2 in which the allylic chloride is methallyl chloride.

4. The process of claim 2 in which the allylic chloride is allyl chloride.

5. The process of claim 1 in which the cyclic ether is tetrahydrofuran.

6. A solution of a complex of allylmagnesium chloride and at least an equally molecular amount of a cyclic ether selected from the class consisting of tetrahydrofuran, tetrahydropyran, 2-methyltetrahydrofuran, dihydropyran, 2-ethoxytetrahydropyran, tetrahydrofurfuryl ethyl ether and N-methylmorpholine; said complex being dissolved in said cyclic ether.

7. The composition of claim 6 wherein the cyclic ether is tetrahydrofuran and wherein the molar proportion of tetrahydrofuran to the allyl chloride is about 3:1.

8. A solution of a complex of methallylmagnesium chloride and at least an equally molecular amount of a cyclic ether selected from the class consisting of tetrahydrofuran, tetrahydropyran, 2-methyltetrahydrofuran, dihydropyran, 2-ethoxytetrahydropyran, tetrahydrofurfuryl ethyl ether and N-methylmorpholine; said complex being dissolved in said cyclic ether.

9. The composition of claim 8 wherein the cyclic ether is tetrahydrofuran and wherein the molar proportion of tetrahydrofuran to the methallyl chloride is about 3:1.

No references cited.